(12) United States Patent
Wyatt

(10) Patent No.: US 8,037,635 B1
(45) Date of Patent: Oct. 18, 2011

(54) FROG FISHING LURE SYSTEM

(76) Inventor: Christopher A. Wyatt, Spring Hill, FL (US)

( * ) Notice: Subject to any disclaimer, the term of this patent is extended or adjusted under 35 U.S.C. 154(b) by 92 days.

(21) Appl. No.: 12/378,411

(22) Filed: Feb. 13, 2009

(51) Int. Cl.
*A01K 85/00* (2006.01)
(52) U.S. Cl. .................... 43/42.3; 43/42.24; 43/42.15
(58) Field of Classification Search .............. 43/42.3, 43/42.28, 42.26, 42.24, 42.15
See application file for complete search history.

(56) References Cited

U.S. PATENT DOCUMENTS

| | | | | |
|---|---|---|---|---|
| 1,708,015 A * | 4/1929 | Goble | | 43/42.15 |
| 1,833,522 A * | 11/1931 | Goble | | 43/42.3 |
| 1,881,947 A * | 10/1932 | Rawdon | | 43/42.3 |
| 2,544,178 A * | 3/1951 | Pfahler | | 43/42.3 |
| 2,851,814 A * | 9/1958 | Lutz | | 43/42.15 |
| 3,376,663 A * | 4/1968 | Amrine | | 43/42.3 |
| D220,839 S * | 6/1971 | Sabol | | 43/42.3 |
| 3,868,784 A * | 3/1975 | Sabol | | 43/42.3 |
| D239,281 S * | 3/1976 | Williams, Jr. | | 43/42.24 |
| 4,177,597 A * | 12/1979 | Thomassin | | 43/42.3 |
| 4,619,069 A * | 10/1986 | Strickland | | 43/42.26 |
| 4,709,501 A * | 12/1987 | Garst | | 43/42.3 |
| 4,870,775 A * | 10/1989 | Schrader | | 43/42.3 |
| 4,885,867 A * | 12/1989 | Leal | | 43/42.26 |
| 4,887,377 A * | 12/1989 | Morris | | 43/42.24 |
| 4,926,578 A * | 5/1990 | Morse et al. | | 43/42.28 |
| 5,009,024 A * | 4/1991 | Parman | | 43/42.3 |
| 5,428,918 A * | 7/1995 | Garrison | | 43/42.28 |
| 5,490,346 A * | 2/1996 | Guest | | 43/42.24 |
| 5,640,798 A * | 6/1997 | Garst | | 43/42.24 |
| 5,996,271 A * | 12/1999 | Packer | | 43/42.24 |
| 6,138,399 A * | 10/2000 | Wilson | | 43/42.28 |
| 6,195,930 B1 * | 3/2001 | Sato | | 43/42.3 |
| 6,363,651 B1 * | 4/2002 | Garst | | 43/42.28 |
| 6,843,017 B1 * | 1/2005 | Chambers, Sr. | | 43/42.3 |
| 7,080,476 B2 * | 7/2006 | King | | 43/42.3 |
| 7,168,203 B2 * | 1/2007 | Chambers, Sr. | | 43/42.28 |
| 7,266,922 B2 * | 9/2007 | Oelerich et al. | | 43/42.24 |
| 7,308,773 B1 * | 12/2007 | McNaughton | | 43/42.26 |
| 7,610,714 B1 * | 11/2009 | McNaughton | | 43/42.26 |
| 7,730,658 B1 * | 6/2010 | Biffle et al. | | 43/42.28 |
| 7,730,659 B1 * | 6/2010 | Gros | | 43/42.26 |
| 7,774,974 B1 * | 8/2010 | Parks | | 43/42.28 |
| 2003/0192227 A1 * | 10/2003 | Stava et al. | | 43/42.24 |
| 2005/0210732 A1 * | 9/2005 | Guerin | | 43/42.28 |
| 2006/0096154 A1 * | 5/2006 | Meroney | | 43/42.24 |
| 2006/0260176 A1 * | 11/2006 | Yeung | | 43/42.15 |
| 2008/0078114 A1 * | 4/2008 | Pack | | 43/42.15 |
| 2008/0289244 A1 * | 11/2008 | Parks | | 43/42.3 |
| 2009/0183418 A1 * | 7/2009 | Dahlberg | | 43/42.3 |
| 2009/0300967 A1 * | 12/2009 | Rainey | | 43/42.3 |
| 2010/0162612 A1 * | 7/2010 | Kalnas | | 43/42.15 |

* cited by examiner

*Primary Examiner* — Darren W Ark

(57) ABSTRACT

A main body portion has top and bottom surfaces, a front, a rear and opposed sides. The main body portion has a central axis extending between the front and rear. A pair of similarly configured leg portions is integrally fabricated with the main body portion. Each leg portion has an interior section and a spiral exterior section. Each interior section is positioned to extend outwardly at an angle from the rear. Each exterior section has a top and a bottom surface. The spiral exterior section of each leg first extends downwardly and away from the central axis, then downwardly and toward the central axis, then upwardly and toward the central axis. The spiral exterior section of each leg terminates facing away from the central axis.

1 Claim, 1 Drawing Sheet

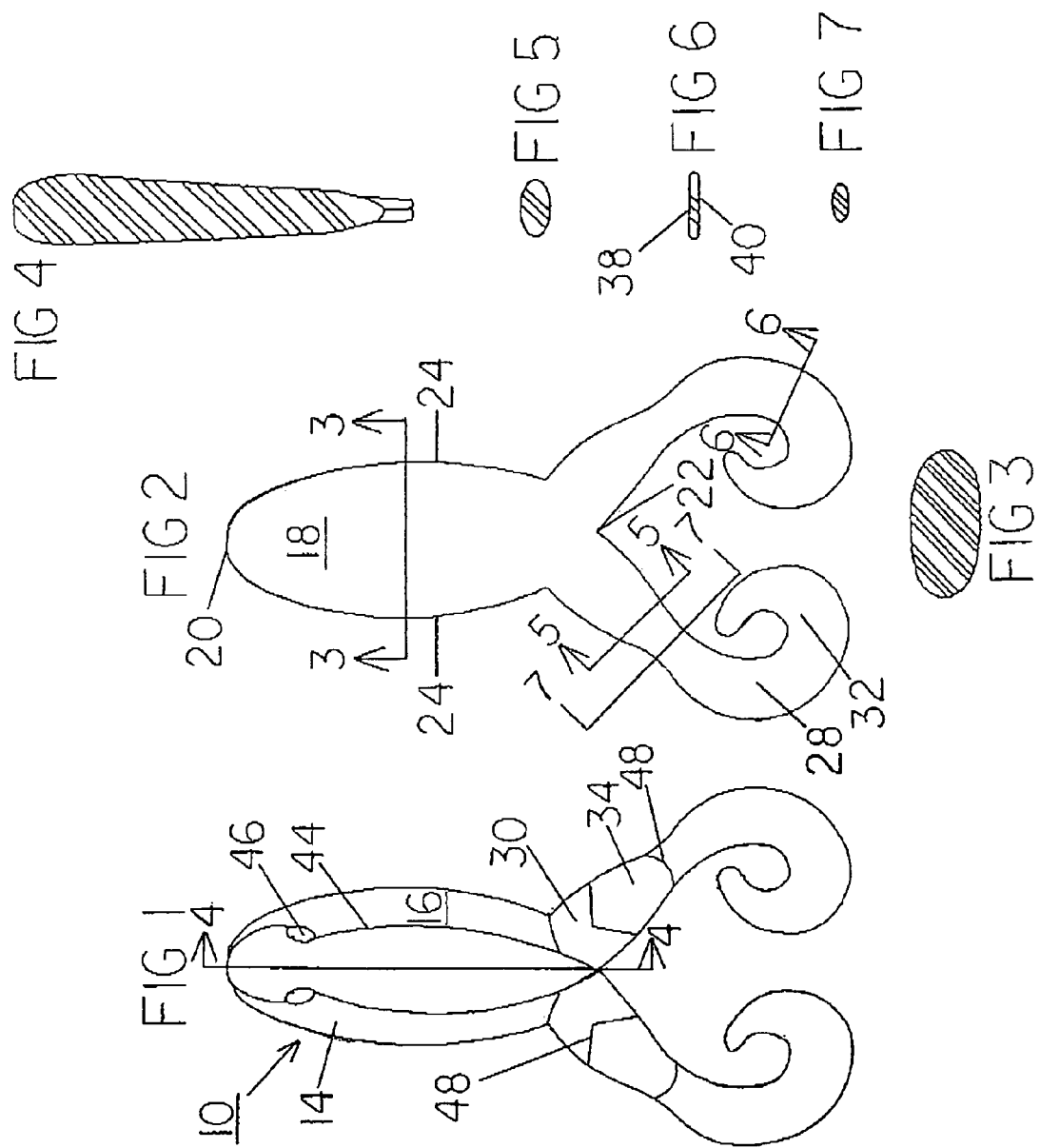

FROG FISHING LURE SYSTEM

BACKGROUND OF THE INVENTION

1. Field of the Invention

The present invention relates to a frog fishing lure system and more particularly pertains to attracting fish with a generally frog shaped lure having inwardly spiraling legs to create movement for enticing fish into striking, the attracting being done in a safe, convenient and economical manner.

2. Description of the Prior Art

The use of fishing lures of known designs and configurations is known in the prior art. More specifically, fishing lures of known designs and configurations previously devised and utilized for the purpose of attracting fish through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,885,867 issued Dec. 12, 1989 to Leal discloses a Simulated Frog Fishing Lure. While this device fulfills its respective, particular objectives and requirements, the aforementioned patent does not describe a frog fishing lure system that allows for attracting fish with a generally frog shaped lure having inwardly spiraling legs to create movement for enticing fish into striking, the attracting being done in a safe, convenient and economical manner.

In this respect, the frog fishing lure system according to the present invention substantially departs from the conventional concepts and designs of the prior art, and in doing so provides an apparatus primarily developed for the purpose of attracting fish with a generally frog shaped lure having inwardly spiraling legs to create movement for enticing fish into striking, the attracting being done in a safe, convenient and economical manner.

Therefore, it can be appreciated that there exists a continuing need for a new and improved frog fishing lure system which can be used for attracting fish with a generally frog shaped lure having inwardly spiraling legs to create movement for enticing fish into striking, the attracting being done in a safe, convenient and economical manner. In this regard, the present invention substantially fulfills this need.

SUMMARY OF THE INVENTION

In view of the foregoing disadvantages inherent in the known types of fishing lures of known designs and configurations now present in the prior art, the present invention provides an improved frog fishing lure system. As such, the general purpose of the present invention, which will be described subsequently in greater detail, is to provide a new and improved frog fishing lure system and method which has all the advantages of the prior art and none of the disadvantages.

To attain this, the present invention essentially comprises a frog fishing lure system. First provided is a main body portion. The main body portion has a top surface. The main body portion has a bottom surface. The main body portion has a front. The main body portion has a rear. The main body portion has opposed sides. The top and bottom surfaces of the main body portion have an oval configuration. The top and bottom surfaces have a maximum length of about 3 inches measured from the front to the rear. The top and bottom surfaces have a maximum width of about 1 inch between the sides. The main body portion has an oval cross section. The oval cross section is latitudinally configured. The oval cross section has a maximum height of about 0.25 inches from the top surface to the bottom surface. The main body portion has a tear drop cross sectional configuration longitudinally. A central axis extends from the front to the rear. The teardrop shaped cross-sectional configuration is thicker adjacent to the front than to the rear.

A pair of similarly configured leg portions is provided. The leg portions are integrally fabricated with the rear of the main body portion. Each leg portion has a generally linear interior section. Each leg portion has a spiral exterior section. Each leg portion has an intermediate section. The intermediate section is provided between the interior and exterior sections.

Each interior section is positioned to extend outwardly from the rear of the main body portion. Each interior section has a length of about 1.50 inches. Each interior section has an oval cross sectional configuration. Each interior section continuously decreases in width. The maximum width of each interior section is provided adjacent to the main body portion. The interior sections project symmetrically from the rear of the main body portion at an angle of about 90 degrees.

Each intermediate section has a width less than the cross sectional widths of the interior and exterior sections there adjacent.

Each exterior section has a planar top surface. Each exterior section has a parallel bottom surface. The spiral exterior section of each leg first extends downwardly and away from the central axis. The spiral exterior section of each leg then extends downwardly and toward the central axis, then upwardly and toward the central axis. The spiral exterior section of each leg terminates facing away from the central axis.

The maximum length of the main body portion is between 50 percent and 60 percent of a maximum length of the entire system. The maximum width of the main body portion is between 30 percent and 40 percent of the length of the entire system. The entire system is fabricated of a flexible elastomeric material. The flexible elastomeric material is selected from the class of flexible elastomeric materials. The class of flexible elastomeric materials includes plastic and rubber, natural and synthetic, and blends thereof. The flexible elastomeric material is preferably silicone.

Further provided are projection lines. The projection lines are provided on the top of the main body portion adjacent to the sides. The projection lines extend from the front to the rear. In this manner increased lateral flexibility is provided on the top. Further in this manner the appearance and motion of a frog is simulated. The projection lines include regions. The regions simulate eyes of the a frog.

Provided last are additional recessed projection lines. The additional recessed projection lines are provided on each leg on opposite sides of each intermediate section. In this manner the flexing of the legs to simulate the appearance and motion of the frog when swimming resulting from relative movement between the system and water is maximized.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved frog fishing lure system which has all of the advantages of the prior art fishing lures of known designs and configurations and none of the disadvantages.

It is another object of the present invention to provide a new and improved frog fishing lure system which may be easily and efficiently manufactured and marketed.

It is further object of the present invention to provide a new and improved frog fishing lure system which is of durable and reliable constructions.

An even further object of the present invention is to provide a new and improved frog fishing lure system which is susceptible of a low cost of manufacture with regard to both materials and labor, and which accordingly is then susceptible of low prices of sale to the consuming public, thereby making such frog fishing lure system economically available to the buying public.

Even still another object of the present invention is to provide a frog fishing lure system for attracting fish with a generally frog shaped lure having inwardly spiraling legs to create movement for enticing fish into striking, the attracting being done in a safe, convenient and economical manner.

Lastly, it is an object of the present invention to provide a new and improved frog fishing lure system. A main body portion has top and bottom surfaces, a front, a rear and opposed sides. The main body portion has a central axis extending between the front and rear. A pair of similarly configured leg portions is integrally fabricated with the main body portion. Each leg portion has an interior section and a spiral exterior section. Each interior section is positioned to extend outwardly at an angle from the rear. Each exterior section has a top and a bottom surface. The spiral exterior section of each leg first extends downwardly and away from the central axis, then downwardly and toward the central axis, then upwardly and toward the central axis. The spiral exterior section of each leg terminates facing away from the central axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a plan view of a frog fishing lure system constructed in accordance with the principles of the present invention.

FIG. 2 is a bottom view of the frog lure system illustrated in FIG. 1.

FIGS. 3, 4, 5, 6 and 7 are cross sectional views taken alone lines 3-4, 4-4, 5-5, 6-5 and 7-7 of FIGS. 1 and 2.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved frog fishing lure system embodying the principles and concepts of the present invention and generally designated by the reference numeral 10 will be described.

The present invention, the frog fishing lure system 10 is comprised of a plurality of components. Such components in their broadest context include a main body portion and a pair of leg portions. Such components are individually configured and correlated with respect to each other so as to attain the desired objective.

First provided is a main body portion 14. The main body portion has a top surface 16. The main body portion has a bottom surface 18. The main body portion has a front 20. The main body portion has a rear 22. The main body portion has opposed sides 24. The top and bottom surfaces of the main body portion have an oval configuration. The top and bottom surfaces have a maximum length of about 3 inches measured from the front to the rear. The top and bottom surfaces have a maximum width of about 1 inch between the sides. The main body portion has an oval cross section. The oval cross section is latitudinally configured. The oval cross section has a maximum height of about 0.25 inches from the top surface to the bottom surface. The main body portion has a tear drop cross sectional configuration longitudinally. A central axis extends from the front to the rear. The teardrop shaped cross-sectional configuration is thicker adjacent to the front than to the rear.

A pair of similarly configured leg portions 28 is provided. The leg portions are integrally fabricated with the rear of the main body portion. Each leg portion has a generally linear interior section 30. Each leg portion has a spiral exterior section 32. Each leg portion has an intermediate section 34. The intermediate section is provided between the interior and exterior sections.

Each interior section is positioned to extend outwardly from the rear of the main body portion. Each interior section has a length of about 1.50 inches. Each interior section has an oval cross sectional configuration. Each interior section continuously decreases in width. The maximum width of each interior section is provided adjacent to the main body portion. The interior sections project symmetrically from the rear of the main body portion at an angle of about 90 degrees.

Each intermediate section has a width less than the width of the interior and exterior sections there adjacent.

Each exterior section has a planar top surface 38. Each exterior section has a parallel bottom surface 40. The spiral exterior section of each leg first extends downwardly and away from the central axis. The spiral exterior section of each leg then extends downwardly and toward the central axis, then upwardly and toward the central axis. The spiral exterior section of each leg terminates facing away from the central axis.

The maximum length of the main body portion is between 50 percent and 60 percent of a maximum length of the entire system. The maximum width of the main body portion is between 30 percent and 40 percent of the length of the entire system. The entire system is fabricated of a flexible elastomeric material. The flexible elastomeric material is selected from the class of flexible elastomeric materials. The class of flexible elastomeric materials includes plastic and rubber, natural and synthetic, and blends thereof. The flexible elastomeric material is preferably silicone.

Further provided are projection lines 44. The projection lines are provided on the top of the main body portion adjacent to the sides. The projection lines extend from the front to the rear. In this manner increased lateral flexibility is provided on the top. Further in this manner the appearance and motion of a frog is simulated. The projection lines include regions 46. The regions simulate eyes of the a frog.

Provided last are additional recessed projection lines 48. The additional recessed projection lines are provided on each leg on opposite sides of each intermediate section. In this manner the flexing of the legs to simulate the appearance and motion of the frog when swimming resulting from relative movement between the system and water is maximized.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A frog fishing lure system for attracting fish with a generally frog shaped lure having inwardly spiraling legs to create a movement for enticing fish into striking, the system comprising, in combination:

a main body portion having a top surface and a bottom surface and having a front and a rear and opposed sides, the top and bottom surfaces of the main body portion having an oval configuration with a maximum length of about 3 inches measured from the front to the rear and a maximum width of about 1 inch between the sides, the main body portion having an oval cross section latitudinally configured with a maximum height of about 0.25 inches from the top surface to the bottom surface, the main body portion being a tear drop cross sectional configuration longitudinally with a central axis extending from the front to the rear, the teardrop shaped cross-sectional configuration being thicker adjacent to the front than to the rear;

a pair of similarly configured leg portions integrally fabricated with the rear of the main body portion, each leg portion having a generally linear interior section and a spiral exterior section and an intermediate section between the interior and exterior sections;

each interior section positioned to extend outwardly from the rear of the main body portion with a length of about 1.50 inches, each interior section having an oval cross sectional configuration continuously decreasing in area with a maximum area adjacent to the main body portion, the interior sections of the legs projecting symmetrically from the rear of the main body portion and forming an angle of about 90 degrees therebetween;

each intermediate section having a width less than the widths of the interior and exterior sections there adjacent;

each exterior section having a planar top surface and a bottom surface parallel to the top surface, the spiral exterior section of each leg first extending downwardly and away from the central axis, then downwardly and toward the central axis, then upwardly and toward the central axis, then terminating facing away from the central axis;

the maximum length of the main body portion being between 50 percent and 60 percent of a maximum length of the entire system, the maximum width of the main body portion being between 30 percent and 40 percent of the maximum length of the entire system, the entire system being fabricated of silicone;

projection lines on the top surface of the main body portion adjacent to the sides and extending from the front to the rear for increased lateral flexibility on the top surface and for simulating the appearance and motion of a frog, the projection lines including regions simulating eyes of the frog; and additional recessed projection lines on each leg portion on opposite sides of each intermediate section to maximize the flexing of the leg portions to simulate the appearance and motion of the frog when swimming resulting from relative movement between the system and water.

* * * * *